US006838862B2

(12) United States Patent
Luu

(10) Patent No.: US 6,838,862 B2
(45) Date of Patent: Jan. 4, 2005

(54) PULSE WIDTH MODULATOR HAVING REDUCED SIGNAL DISTORTION AT LOW DUTY CYCLES

(75) Inventor: Ky Thoai Luu, Mason, OH (US)

(73) Assignee: Harris Corporation, Melbourne, FL (US)

( * ) Notice: Subject to any disclaimer, the term of this patent is extended or adjusted under 35 U.S.C. 154(b) by 91 days.

(21) Appl. No.: 10/407,689

(22) Filed: Apr. 4, 2003

(65) Prior Publication Data

US 2004/0196012 A1 Oct. 7, 2004

(51) Int. Cl.[7] ............................................... G05F 1/40
(52) U.S. Cl. ......................................... 323/274; 323/303
(58) Field of Search ................................. 323/273, 274, 323/275, 276, 277, 56, 57, 58, 299, 303

(56) References Cited

U.S. PATENT DOCUMENTS

| 4,254,372 A | * | 3/1981 | Moore, Jr. .................... 323/277 |
| 4,739,465 A | | 4/1988 | Asano et al. |
| 4,743,785 A | | 5/1988 | Milberger et al. |
| 4,816,741 A | * | 3/1989 | Ekstrand ..................... 323/297 |
| 5,515,258 A | | 5/1996 | Viertler |
| 5,646,837 A | | 7/1997 | Weggel |

* cited by examiner

*Primary Examiner*—Jessica Han
(74) *Attorney, Agent, or Firm*—Tarolli, Sundheim, Covell & Tummino L.L.P.

(57) ABSTRACT

A pulse width modulation apparatus includes a load circuit, a signal switch, a shunt switch, and a resistor. The signal switch isolates the load circuit from a voltage source along a signal path. The shunt switch is connected to the signal path at a point between the signal switch and the load circuit. The shunt switch isolates the signal path from a ground voltage. A resistor is connected in series between the signal switch and the shunt switch.

19 Claims, 4 Drawing Sheets

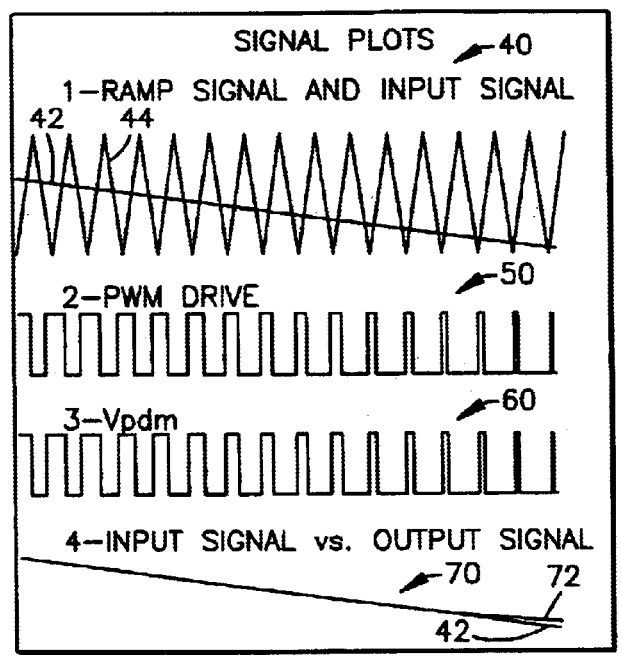
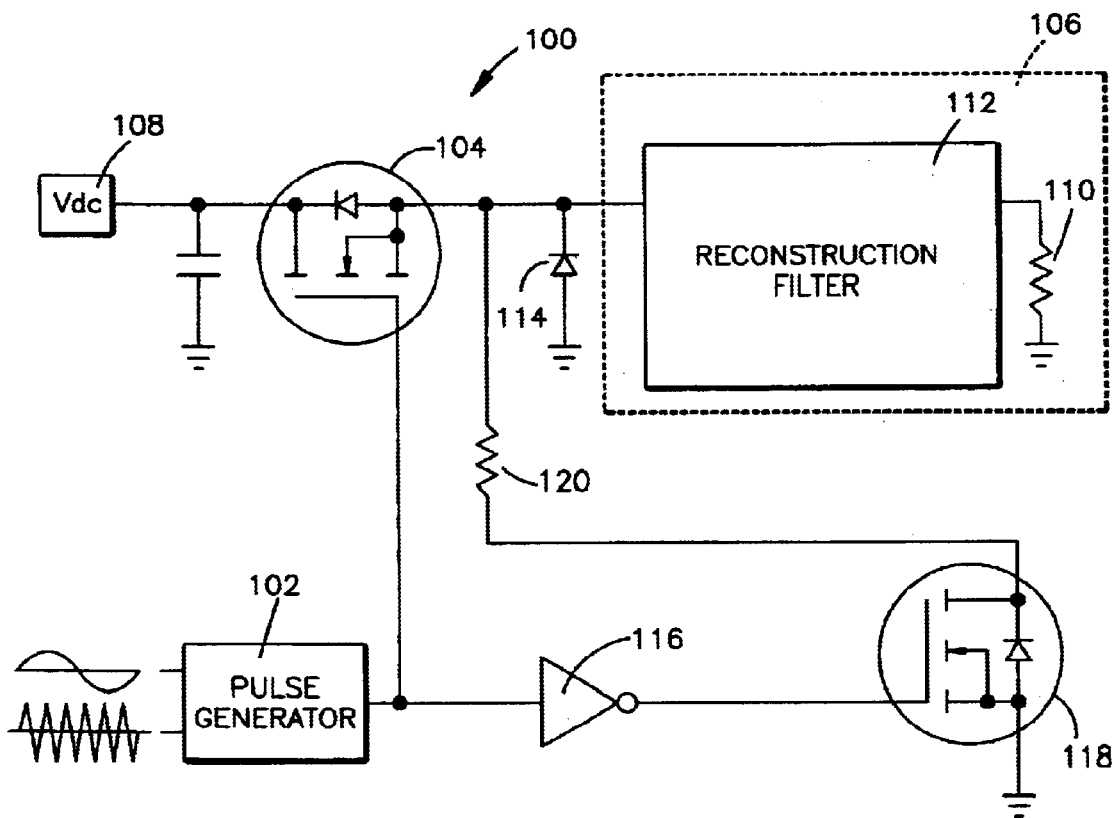

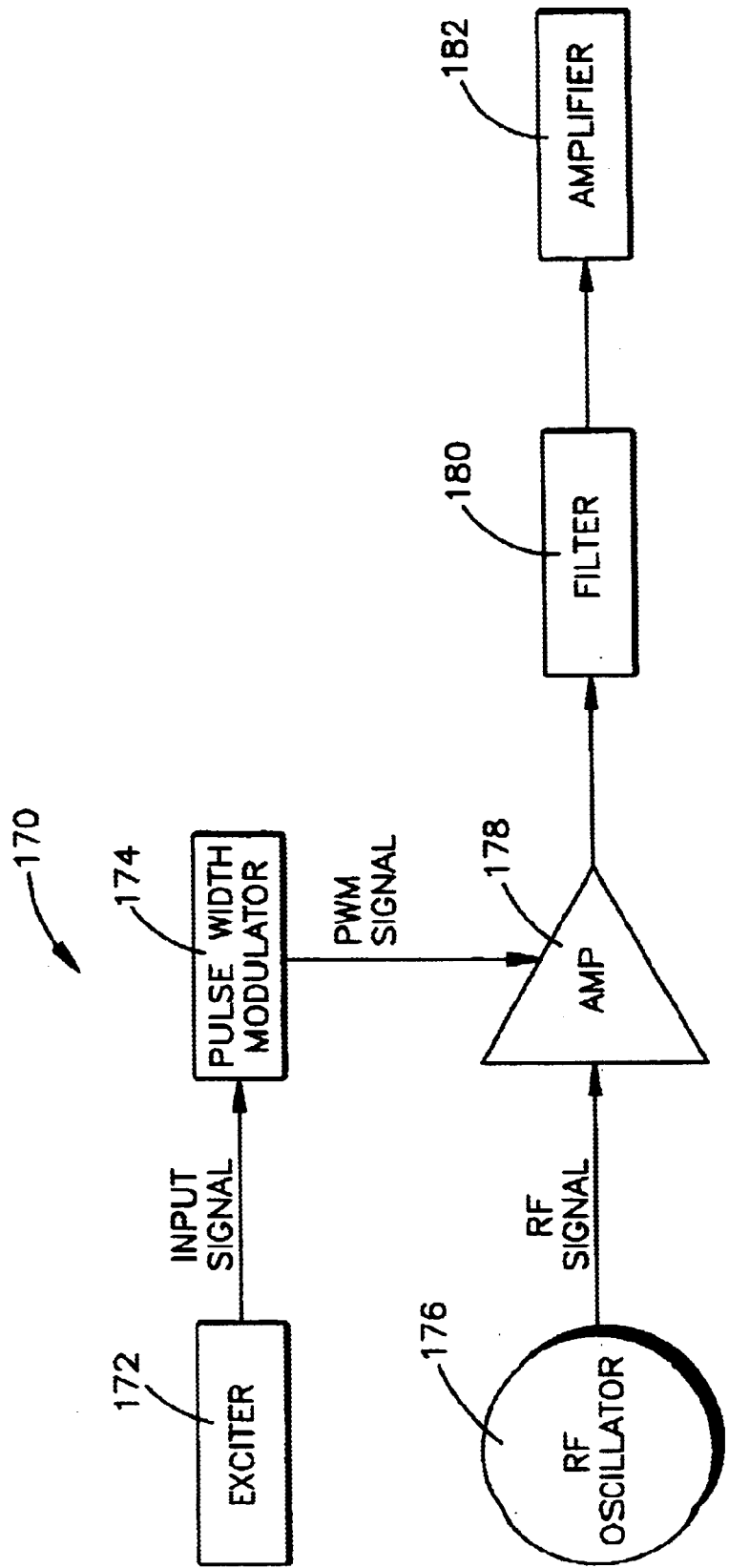

PULSE WIDTH MODULATOR HAVING REDUCED SIGNAL DISTORTION AT LOW DUTY CYCLES

BACKGROUND OF THE INVENTION

1. Technical Field

The present invention relates generally to electronic devices, and more particularly to a pulse width modulation system.

2. Description of the Prior Art

Pulse width modulation is a common method of amplifying an audio signal with high efficiency even at high levels of amplification. The technique is linear for a large signal and can be used to achieve a very high power gain. In pulse width modulation, the length of each pulse is indicative of the amplitude of the input signal over one cycle of a high-frequency ramp signal. The pulse can be compared to the ramp signal at a receiver to reconstruct the signal.

FIG. 1 illustrates a prior art pulse width modulation system 10. An input signal and a symmetric ramp signal are received at a pulse generator 12. The pulse generator 12 compares the two signals, outputting a voltage high during the periods when the input signal exceeds the ramp. For each cycle of the ramp signal, the pulse generator 12 will create a pulse of a width dependent upon the signal amplitude during that cycle. This is known as the duty cycle of the signal, and the length of an individual pulse is described as a percentage of this duty cycle.

The pulses are passed as a control signal to a switch 14. When the control signal is at a high voltage, the switch 14 closes a circuit including a high voltage source 15, a reconstruction filter 16, and a load 18. This applies the voltage across the load 18 to generate an output signal. When the control signal exhibits a low voltage, the switch 14 isolates the voltage source 15 from the load 18.

The reconstruction filter includes a number of inductors (e.g., 20 and 22) and capacitors (e.g., 24 and 26). These components store energy while the switch 14 is closed and release it as a residual voltage after the switch is opened. For example, the inductors 20 and 22 produce a reverse voltage according to the decrease in the current through the inductors after a certain time. To prevent this induced voltage from distorting the signal, a shunt diode 28 is provided on the circuit. The shunt diode 28 is positioned with its anode to ground such that it will conduct when the switch 14 is switched off. Thus, the shunt diode 28 allows the current flow generated by the inductors 20 and 22 a safe passage to ground when the filter 16 is isolated from the voltage source 15.

The system illustrated in FIG. 1 is effective for pulses having a high duty cycle. For high duty pulses, the amount of current passing through the inductors 20 and 22 is sufficiently large for its cessation to induce a significant reverse voltage. This reverse voltage overcomes a bias of the diode 28 to open the path to ground. When the duty cycle becomes small, however, the current flow through the inductors 20 and 22 is less, and hence the bias of the diode 28 is switched at much lower speed. In such a case, the induced voltage will artificially widen the voltage pulses provided to the load 18, distorting the output signal.

FIG. 2 illustrates a series of graphs showing the signal properties at various points within the prior art system. All of the graphs show the signal amplitudes against a progression of time. The first graph 40 illustrates a declining input signal 42 superimposed upon a cyclic ramp signal 44. The second graph 50 illustrates a drive signal that would be produced by the pulse generator 12 upon receiving the signals depicted in the first graph 40. The third graph 60 illustrates an output signal of the system. As the graphs indicate, the pulse width of the drive signal gets smaller as the distortion in the output signal grows larger. The output signal shows an increased pulse width when compared to the drive signal. The fourth graph 70 illustrates the results of this distortion. The graph compares the input signal 42 to a signal 72 recreated from the output of the pulse width modulator. As the graph illustrates, the recreated signal 72 diverges from the input signal 42 at low amplitudes.

FIG. 3 illustrates a second prior art system 80. An input signal and a ramp signal are received at a pulse generator 82. The pulse generator produces a drive signal that is provided to a first switch 84 as a control signal. The first switch 84 operates to provide a high voltage pulse from a voltage source 85 to a load circuit 86 comprising a reconstruction filter 88 and a load 90 in a manner similar to that described for FIG. 1 above.

The drive signal is also provided to a dead time generator 92. The dead time generator 92 produces an inverted drive signal containing a period of dead time after each pulse. This signal is provided as a shunt control signal to a second switch 94. The second, or shunt, switch 94 provides a path to ground from the load circuit 86. Because the second switch is controlled by an inversion of the drive signal controlling the first switch, the second switch should close just as the first switch opens. This creates a path to ground for the current produced by the reconstruction filter 88.

Unfortunately, the timing of the switches cannot be made exact. Such mistiming can lead to catastrophic system failure if the first switch 84 is not fully opened before the shunt switch 94 closes. The resulting short-circuit can destroy both switches. The dead time introduced in the dead time generator 92 prevents these timing failures. By leaving both switches off during a predetermined dead time, the timing issues on the switches can be avoided. Unfortunately, however, the dead time is itself a source of signal distortion. Accordingly, the system 80 of FIG. 3 provides little improvement over the system 10 of FIG. 1.

SUMMARY OF THE INVENTION

In accordance with one embodiment of the present invention, a pulse width modulation apparatus includes a load circuit, a signal switch, a shut switch, and a resistor. The signal switch isolates the load circuit from a voltage source along a signal path. A shunt switch is connected to the signal path at a point between the signal switch and the load circuit. The shunt switch isolates the signal path from a ground voltage. A resistor is connected in series between the signal switch and the shunt switch.

In accordance with another aspect of the invention, a pulse width modulation system includes a power supply, a load circuit, a signal switch, a shunt switch, and a resistor. The power supply provides voltage to the load circuit along a signal path. The signal switch controls the flow of current along the signal path. The shunt switch controls the flow of current from the signal path to a ground voltage. A resistor restricts the flow of current between the signal switch and the shunt switch.

In accordance with yet another aspect of the present invention, a method is disclosed for generating a pulse width modulated signal. Signal pulses, each having an associated pulse width, are provided across a load circuit, such that the load circuit accumulates residual energy. The residual energy from each signal pulse is shunted through a shunt diode when the associated pulse width of the signal pulse is above a threshold width. The residual energy from each signal pulse is shunted through a shunt switch when the associated pulse width of the signal is below a threshold width.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 illustrates a series of graphs depicting signals within the system of FIG. 1;

FIG. 4 illustrates a simplified circuit diagram of a pulse width modulator in accordance with an aspect of the present invention;

FIG. 7 illustrates an AM transmitter utilizing a pulse width modulator in accordance an aspect with the present invention.

DETAILED DESCRIPTION OF THE INVENTION

Figure 1:
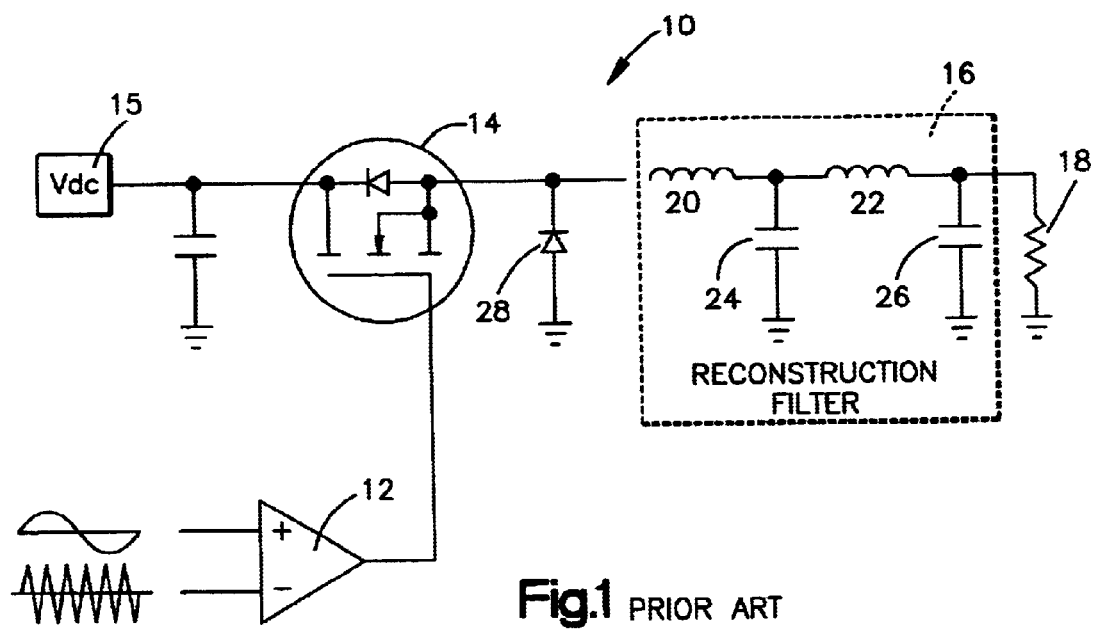
FIG. 1 illustrates a simplified circuit diagram of a prior art pulse width modulator.
Figure 3:
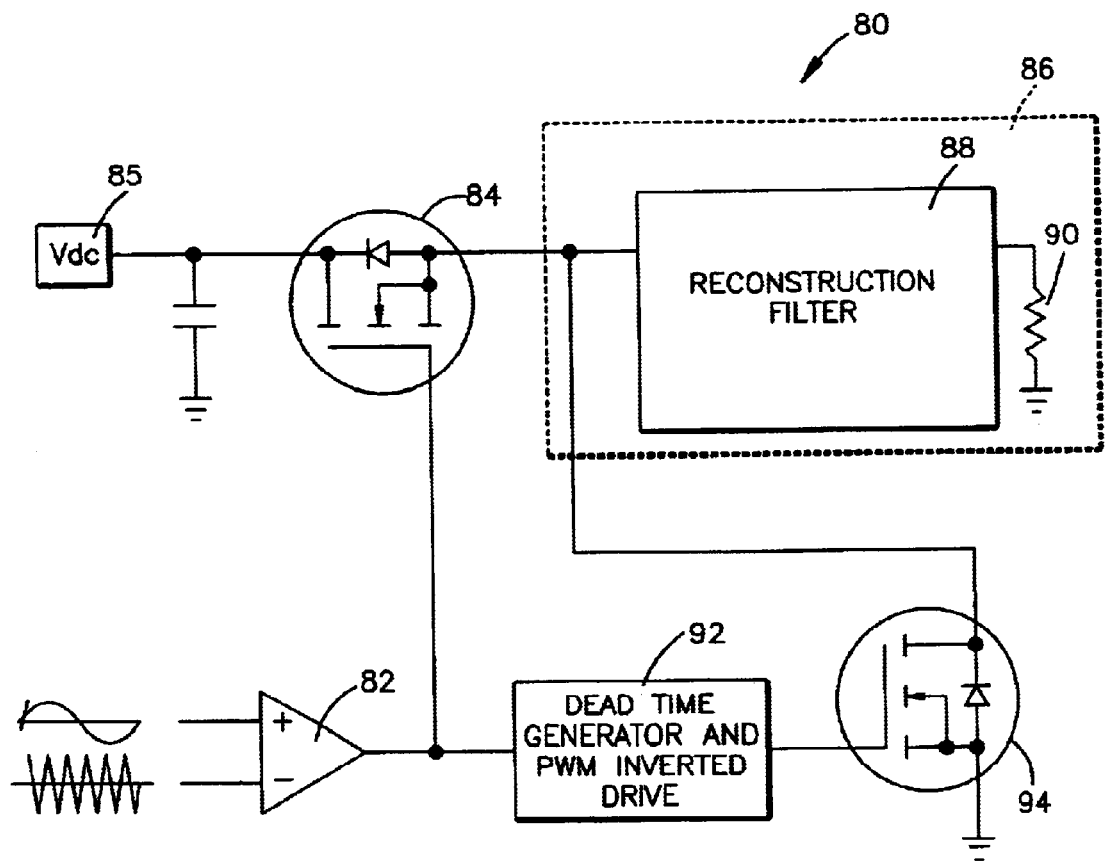
FIG. 3 illustrates a simplified circuit diagram of another prior art pulse width modulator.

The present invention relates to a system for pulse width modulation of an input signal. A pulse generator receives an input signal and generates an associated drive signal. The drive signal is provided to a first switch, while an inverted drive signal is provided to a second switch. The first switch isolates a load circuit from a voltage source, while the second circuit isolates the first switch and the load circuit from a system ground. A resistor is placed between the first switch and the second switch.

The present invention overcomes one or more known obstacles in digital-to-analog converter design. The system of the present invention includes a switched shunt that operates without the need for the protective dead time discussed above. This allows the system to produce a pulse width modulated output signal that is substantially free from distortion.

FIG. 4 illustrates an exemplary pulse width modulation system 100 in accordance with one aspect of the present invention. An input signal is received at a pulse generator 102. The pulse generator can be implemented as one or more comparators or as any other appropriate hardware or software signal processing components. The pulse generator 102 generates a drive signal according to a comparison between the input signal and a cyclic ramp signal. The drive signal will exhibit a low voltage and a high voltage state. The ramp signal can be any appropriate signal and include either a symmetric or an asymmetric cycling pattern. In an example embodiment, the ramp signal is a symmetric triangular signal.

The drive signal is provided to a first switch 104, the signal switch, as a control signal. The signal switch 104 isolates a load circuit 106 from a voltage source 108 when the drive signal exhibits a low voltage state. The signal switch 104 can be implemented as a transistor, an electromechanical switch, or as any other appropriate structure for selectively isolating a portion of a circuit. In the example embodiment, the signal switch 104 is implemented as a transistor.

When the drive signal exhibits a high voltage state, the signal switch 104 closes to connect the voltage source 108 to the load circuit 106. The load circuit 106 will comprise a load 110 and can comprise one or more elements for filtering or smoothing the output signal. In the illustrated example, the load circuit 106 comprises a load 110 and a reconstruction filter 112. The load can comprise an antenna, a transformer, or any similar electrical component or device for which it is desirable to provide a pulse modulated signal. The reconstruction filter 116 smooths the pulses provided from the voltage source 108 to reduce distortion in the pulses provided to the load 110. The reconstruction filter may include capacitors, inductors, or any other appropriate components for rectifying the signal. In the illustrated embodiment, the reconstruction filter is a two-stage choke-input filter.

A shunt diode 114 is provided to shunt the reverse voltage induced within the reconstruction filter 112. The shunt diode 114 is connected in parallel to a signal path between the signal switch 104 and the load circuit 106 at its cathode and to a ground voltage at its anode. The shunt diode 114 has an associated forward bias voltage.

The drive signal from the pulse generator 102 is also provided to an inverter 116 that outputs an inverted drive signal. The inverted drive signal controls a second switch 118, hereinafter referred to as the shunt switch 118. The shunt switch 118 is connected to the signal path between the signal switch 104 and the load circuit 106 as to isolate these components from a ground voltage. The shunt switch 118 is connected at a point upstream of the shunt diode 114. By upstream, it is meant that the second switch is connected to the signal path at a point closer to the voltage source 108 than point at which the shunt diode 114 is connected. A resistor 120 is connected in series between the signal switch 104 and the shunt switch. This resistor 120 can include any of a number of known resistors and can be of fixed or variable resistance. The necessary resistance of the resistor 120 will vary with the application, specifically with the voltage of the voltage source 108.

When a signal having a high duty cycle is introduced to the duty circuit, a comparably large amount of current will pass through the reconstruction filter 112. When the signal switch 104 is opened, the cessation of current through the filter will induce a significant voltage within the reconstruction filter. This voltage will overcome the bias of the diode and current will flow to ground through the shunt diode 114. The shunt diode 114 thus provides a path to ground to drain the residual energy stored within the reconstruction filter 112. While the shunt switch 118 provides a parallel path for the current, the current passing through the resistor 120 is minimal. The shunt diode 114 provides a path that is substantially free of resistance, and the majority of the current will pass to ground along this path.

When a signal of a low duty cycle is provided to the load circuit 106, significantly less current will pass through the reconstruction filter 112. When the current ceases, the change in current through the reconstruction filter 112 will be significantly less. This induces a smaller reverse voltage. For a low duty cycle, the induced voltage will thus require a longer period to overcome the forward bias of the shunt diode 114. Accordingly, the vast majority of the current will flow to ground through the second switch 118, as the resistor 120 will produce significantly less impedance than the load circuit 106. Thus the residual energy of the reconstruction filter 112 is shunted to ground away from the load even for signals having a small duty cycle.

The present invention does not require a dead time during switching. Instead, the resistor 120 protects the switches 104 and 118 from a short circuit brought on by timing errors in the switching. If a timing error occurs, the resistor 120 will limit the current to prevent the destruction of the switches 104 and 118. This allows the system to be operated without an artificial dead time, mitigating the distortion of the output signal at small duty cycles.

Figure 5:
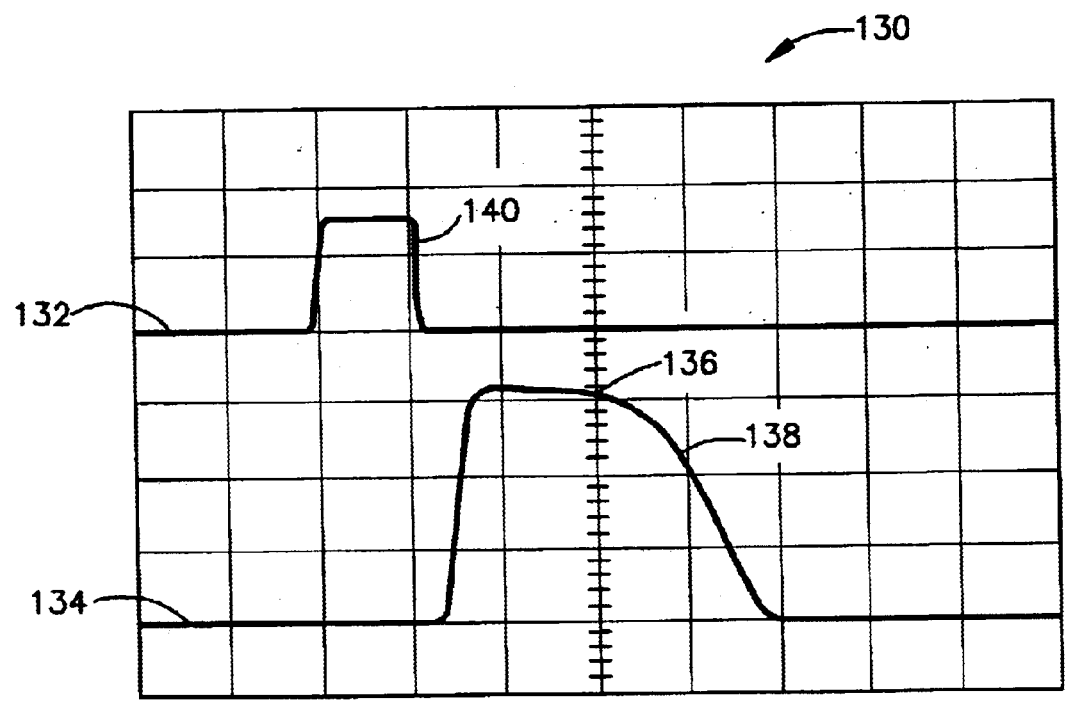
FIG. 5 illustrates a graph comparing a drive signal and an output signal from a prior art pulse width modulator.

FIG. 5 illustrates a graph 130 depicting a low duty cycle drive signal 132 and a pulse width modulated output signal 134 within a prior art pulse width modulator as depicted in FIG. 1. The signals 132 and 134 are depicted as amplitude value over a progression of time. As can be seen in the graph, the output signal 134 shows significant distortion at the tail of a pulse 136. Instead of falling abruptly, the pulse 136 trails off in a sloping tail 138. In addition, the output pulse 136 has a width well over twice that of the input pulse 140. One skilled in the art will appreciate that such a disparity in the duration of the drive signal 132 and the output signal 134 will lead to significant signal distortion.

Figure 6:
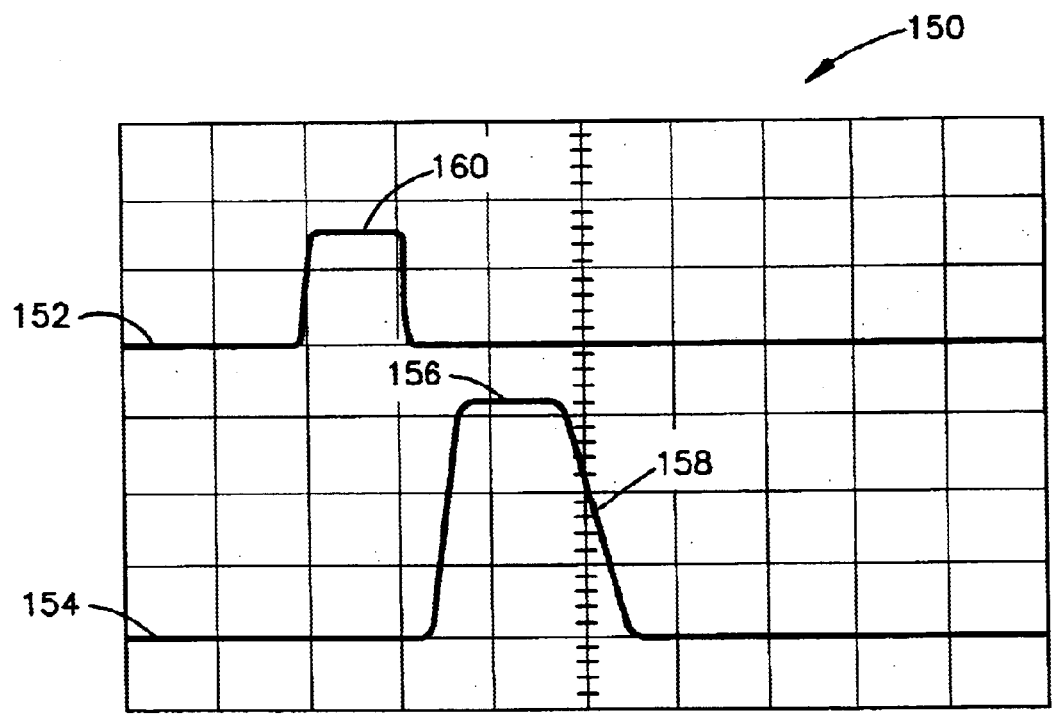
FIG. 6 illustrates a graph comparing a drive signal and an output signal from a pulse width modulator in accordance with an aspect of the present invention.

FIG. 6 illustrates a graph 150 depicting a low duty cycle drive signal 152 and a pulse width modulated output signal 154 within an exemplary pulse width modulation system in accordance with an aspect of the present invention. The signals 152 and 154 are depicted as amplitude value over a progression of time. As the graph 150 illustrates, the output pulse 156 produced by the exemplary system exhibits a steeper tail 158 than the output pulse 136 of the prior art system. Further, the output pulse 156 of the exemplary system has a width and shape roughly similar to that of the drive pulse 160. One skilled in the art will appreciate that the output pulse 156 of the exemplary system shows considerably less signal distortion than the output pulse 136 produced by the prior art system.

FIG. 7 illustrates a broadcast transmission system 170 according to an aspect of the present invention. This transmission system 170 is merely an exemplary embodiment of the present invention, and the claimed pulse width modulator may be used in other transmission systems or applications other than broadcast transmission. An input signal is produced at an exciter 172. The input signal is provided to a pulse width modulator 174 constructed in accordance with the present invention. The pulse width modulator 174 produces a pulse width modulated signal that is passed to an amplifier 176 at a gain input. A RF oscillator 178 provides a RF signal to the amplifier 176, which amplifies the RF signal at a gain determined by the pulse modulated signal. The amplified signal is filtered at a bandpass filter 180 to remove harmonics produced during amplification. The filtered signal is then provided to an antenna 182, which broadcasts the signal.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein. Further, to the extent that the term "includes" is used in either the detailed description or the claims, such term is intended to be inclusive in a manner similar to the term "comprising."

Having described the invention, I claim the following:

1. A pulse width modulation apparatus, comprising:

a load circuit, including a load;

a signal switch that isolates the load circuit from a voltage source along a signal path;

a shunt switch, connected to the signal path at a point between the signal switch and the load circuit, that isolates the signal path from a ground voltage;

a resistor connected in series between the signal switch and the shunt switch.

2. An apparatus as set forth in claim 1, wherein the apparatus further includes a shunt diode, connected to the signal path at its cathode and to a ground voltage at its anode.

3. An apparatus as set forth in claim 1, wherein the load comprises an antenna.

4. An apparatus as set forth in claim 1, wherein the load circuit further comprises a filter.

5. An apparatus as set forth in claim 4, wherein the filter comprises at least one inductor.

6. An apparatus as set forth in claim 1, wherein the signal switch and the shunt switch comprise transistors.

7. An apparatus as set forth in claim 1, wherein the apparatus further comprises a pulse generator that receives an input signal and generates a corresponding pulse width modulated drive signal.

8. An apparatus as set forth in claim 1, wherein the apparatus is implemented within a broadcast transmission system.

9. A pulse width modulation system, comprising:

a power supply that provides voltage to a load circuit along a signal path;

a signal switch that controls the flow of current along the signal path;

a shunt switch that controls the flow of current from the signal path to a ground voltage; and a resistor that restricts the flow of current between the signal switch and the shunt switch.

10. A system as set forth in claim 9, wherein the system further includes a pulse generator that receives an input signal and generates a corresponding pulse width modulated drive signal.

11. A system as set forth in claim 10, wherein the signal switch is controlled by the drive signal.

12. A system as set forth in claim 10, wherein the shunt switch is controlled by an inversion of the drive signal.

13. A system as set forth in claim 9, wherein the system further includes a shunt diode that selectively prevents the flow of current from the signal path to a ground voltage.

14. A system as set forth in claim 13, wherein the shunt diode is connected to the signal path at its cathode, such that it prevents the flow of current until a threshold voltage is exhibited at a point of connection.

15. A system as set forth in claim 9, wherein the load circuit comprises a filter and a load, the filter correcting a plurality of signal pulses provided to the load, each signal pulse having an associated pulse width.

16. A system as set forth in claim 15, wherein the filter stores residual energy when a signal pulse is received at the circuit and discharges the residual energy between signal pulses.

17. A system as set forth in claim 16, wherein the residual energy is shunted as a current through the shunt diode for signal pulses above a threshold width, and the residual energy is shunted as a current through the shunt switch when the pulse width associated with the signal pulse is below a threshold width.

18. A system as set forth in claim 9, wherein the system is implemented within a broadcast transmission system.

19. A method of generating a pulse width modulated signal, comprising:

providing signal pulses, having an associated pulse width, across a load circuit, such that the load circuit accumulates residual energy;

shunting the residual energy from each signal pulse through a shunt diode when the associated pulse width of the signal pulse is above a threshold width;

shunting the residual energy from each signal pulse through a shunt switch when the associated pulse width of the signal is below a threshold width.

* * * * *